United States Patent [19]

Yamaguchi

[11] 4,050,120
[45] Sept. 27, 1977

[54] FASTENER

[75] Inventor: Takehisa Yamaguchi, Yokohama, Japan

[73] Assignee: Kato Hatsujyo Co., Ltd., Japan

[21] Appl. No.: 674,031

[22] Filed: Apr. 5, 1976

[30] Foreign Application Priority Data

Dec. 9, 1975   Japan ............................ 50-165288[U]

[51] Int. Cl.² ............................................. A44B 21/00
[52] U.S. Cl. .............................. 24/73 HS; 24/208 A;
85/5 R; 85/80; 24/73 P
[58] Field of Search ............... 24/217 R, 208 A, 73 P,
24/73 HS, 73 PF, 73 PM, 73 PS, 73 S, 208 R;
85/80, 5 R, DIG. 2

[56] References Cited

U.S. PATENT DOCUMENTS

| | | | |
|---|---|---|---|
| 2,724,884 | 11/1955 | Jones ................................ | 24/208 A |
| 2,946,612 | 7/1960 | Ahlgren ............................ | 85/80 X |
| 3,262,168 | 7/1966 | Overhoff ......................... | 24/73 HS |
| 3,272,059 | 9/1966 | Lyday et al. ................... | 24/208 A X |

*Primary Examiner*—G. V. Larkin
*Attorney, Agent, or Firm*—Shapiro and Shapiro

[57] ABSTRACT

A fastener is made of a flexible material for use, for example, in a vehicle to hold a leg member on a plate inserted in an opening in a panel. The fastener comprises a tubular base, a tubular inner portion formed within the base, and a connecting portion connecting the base and the inner portion. The connecting portion has an opening at its center to receive the leg member, there being an obliqued opening at the opposite end to furnish a water-proof connection.

5 Claims, 7 Drawing Figures

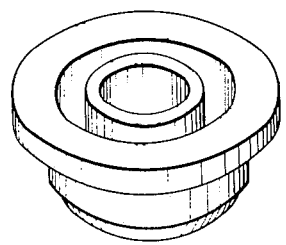
FIG. 1
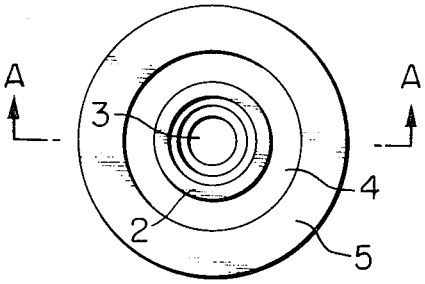
FIG. 2A
FIG. 2B
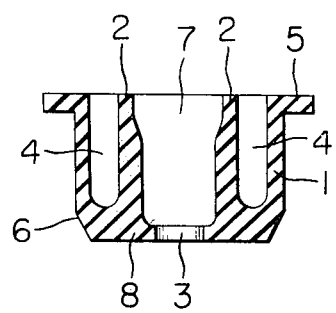
FIG. 2C
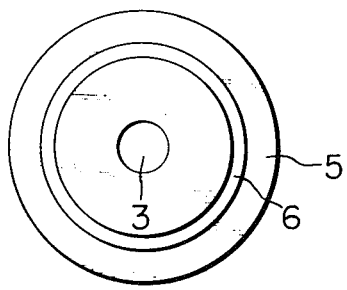
FIG. 3
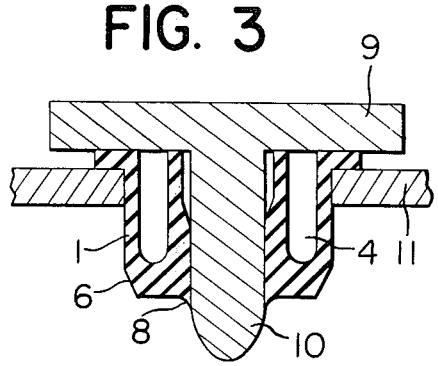
FIG. 4
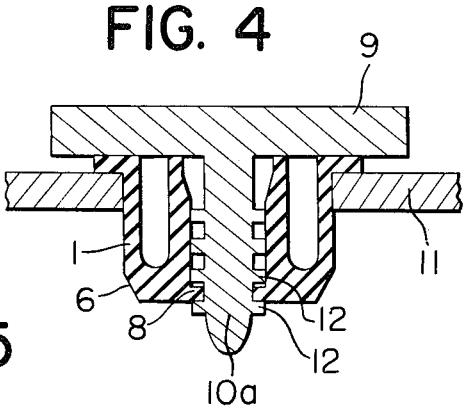
FIG. 5
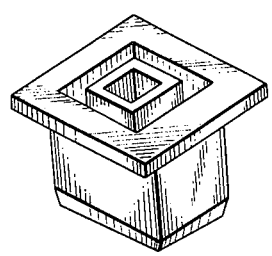

FASTENER

BACKGROUND OF THE INVENTION

1. Field of the Invention

The present invention relates generally to improvements in fasteners, and is more particularly directed to an improved fastener for mounting a plate on the surface of a panel.

2. Description of the Prior Art

For mounting a plate which is used in a vehicle, such as automobile, it is common to use a metallic fastener to insert therein each leg provided on a plate corresponding to each of a plurality of holes formed at definite intervals in a panel. Such fastener, however, is manufactured by press working, and it is not possible to completely seal the holes in the panel to obtain a waterproof assembly. Consequently, the metallic fastener per se or the periphery of each hole is apt to rust so as to significantly impair the article's value, the fastener also becoming weakened.

For overcoming these defects, a resinous fastener has been used instead of a metallic fastener. However, conventional resinous fasteners are not able to compensate for the errors in the spacing of adjacent holes and the variance in sizes or diameters of the holes in a panel, so that it requires precise spacing and close tolerance. Moreover, the resinous fasteners themselves must have precisely correct thickness, and the conventional resinous fastenres are apt to fall off.

SUMMARY OF THE INVENTION

This invention provides a fastener overcoming above mentioned defects.

The fastener of this invention is a water-proof fastener which sufficiently compensates for dimensional error and prevents the plate from falling off.

The fastener of this invention is made of a flexible material and comprises a tubular base, a tubular portion formed within the base, and a connecting portion connecting the tubular base and the tubular portion, the connecting portion having at its center an opening for inserting a leg member of a plate, the fastener having an obliqued opening at its opposite end.

The fastener can be in annular form or in square form or other suitable form.

BRIEF DESCRIPTION OF THE DRAWINGS

FIG. 1 shows a perspective view of a fastener of this invention; FIG. 2A is a plan view of the fastener of FIG. 1;

FIG. 2B is a vertical cross-sectional view taken approximately in the plane of line A-A, and FIG. 2C is a bottom view thereof.

FIG. 3 shows a cross section of an assembly in which the fastener engaged with a plate is securely fixed to a panel.

FIG. 4 shows a modification of the projected leg having protrusions.

FIG. 5 shows another fastener having a square shape.

DESCRIPTION OF THE PREFERRED EMBODIMENT

FIGS. 1, 2A, 2B and 2C show an embodiment of a fastener in accordance with the invention which is integrally formed of a suitable flexible material, such as a rubber-like material or an elastomer. The fastener comprises a tubular base 1 and a tubular portion 2 formed within the base 1 with an annular space therebetween, the tubular portion 2 being connected to the base 1 at the connecting portion 8. The outer wall surface of the base 1 has an edge portion 6 inclined toward the leading edge of the base in the axial direction, so that the thickness between the outer and the inner wall faces of the base becomes less toward the bottom of the fastener in the axial direction. Due to this structure, it is relatively easy to insert the fastener into an opening in a panel utilizing its resiliency. The tubular portion 2 is formed inside of the base with a substantially uniform interval or space 4 from the inner wall surface of the base 1. The thickness of the wall of the tubular portion 2 is less toward the top of the fastener in the axial direction. The inner diameter of the central hollow portion 7 of the tubular portion 2 is smaller than the outer diameter of a projected leg member 10 formed on one of the surfaces of the a plate 9, and when the leg member is inserted in the fastener, the leg member 10 and the inner wall surface of the tubular portion 2 contact closely with each other so as to form a secured body. The connecting portion 8, which connects the base 1 and the tubular portion 2, extends radially inwardly through the curve of the edge portion 6 of the base 1. The connecting portion 8 has a hole or opening 3 at its center through which the leading edge of the leg member 10 projects and the leg member 10 is press-fitted therein by the connecting portion 8. The periphery of the connecting portion 8 prevents an edge which engages the periphery of the projected leg member 10 so as to assure the close-contact of the leg member with the inner surface of the tubular portion 2. Thus the plate 9 and the fastener of this invention furnish a completely close-contact assembly to establish a water-proof effect.

At the outer periphery of the upper portion of the base in the axial direction a flange 5 having a suitable width and a thickness is provided, whereby the fastener contacts closely with one surface of the panel 11, which contributes to water-proofness of the assembly. FIG. 3 shows a cross sectional view of the completed assembly.

It will now be explained how to use the fastener. The fastener is mounted on the top in the axial direction of the projected leg member 10 to incorporate them in one body. The incorporated fastener body is inserted into a hole in the panel 11 as shown in FIG. 3 and fixed therein. Due to the annular hollow portion 4 of the fastener, the fastener is relatively easily inclined and deformed so that any deviation in the spacing between the adjacent holes is compensated for a wide range. It is also possible to compensate for working error in the outer diameter of the fastener.

FIG. 4 shows a modification of the projected leg member to be inserted in the fastener. The projected leg member 10a has protrusions 12 so that the inner peripheral edge portion of the connecting portion 8 fits between the adjacent protrusions 12 so as to prevent the leg from being pulled out.

FIG. 5 shows an another embodiment of the fastener of this invention in which, instead of annular or cylindrical contours of the base and inner portions, the whole shape of the fastener is made square. The same effect, however, is realized.

The fastener of this invention, by using it as explained in the foregoing, has an excellent water-proof effect, and well compensates for dimensional error. In practice, the fastener has a significant advantage in that separation of the fastener from the plate and panel is prevented.

I claim:

1. A fastener integrally formed of a flexible material comprising a tubular base portion, a tubular inner portion formed within the base portion, and a connecting portion connecting the base portion with the inner portion, the spacing between the inner portion and the base portion being substantially uniform, the connecting portion having at its center an opening for receiving a projected leg member therethrough, the top of the inner portion being formed with an opening in alignment with the opening in the connecting portion, and a peripheral flange extending outwardly from the top of said base portion.

2. A fastener according to claim 1, in which the base portion is cylindrical and the inner portion is annular.

3. A fastener according to claim 2, in which an annular hollow portion is formed between the cylindrical base portion and the annular portion, the thickness of the base portion being thinner toward the bottom of the fastener in the axial direction, the inner diameter of the annular portion being smaller than the outer diameter of the projected leg member, and the top of the base portion being formed with a flange.

4. The fastener according to claim 1, in which the opening in the center of the connecting portion provides an inner peripheral edge portion for a close fit with a projected leg member.

5. The fastener according to claim 1, in which the base portion and the inner portion are of square shape.

* * * * *